United States Patent
Bonomo et al.

(10) Patent No.: US 6,653,930 B1
(45) Date of Patent: Nov. 25, 2003

(54) URGENCY-BASED VARIABLE CALL NOTIFICATION

(75) Inventors: Paul Bonomo, San Jose, CA (US); William J. Beyda, Cupertino, CA (US); Shmuel Shaffer, Palo Alto, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/312,272

(22) Filed: May 14, 1999

(51) Int. Cl.[7] .............................. G08B 5/22; H04Q 9/00; H04Q 1/30
(52) U.S. Cl. .................. 340/7.59; 340/7.58; 340/7.61; 340/7.62; 340/7.6; 340/7.57; 340/7.21; 340/7.23
(58) Field of Search ............................. 340/7.59, 7.58, 340/7.61, 7.62, 7.6, 7.57, 407.1, 407.2, 7.21, 7.23; 455/415

(56) References Cited

U.S. PATENT DOCUMENTS

| | | | | |
|---|---|---|---|---|
| 4,959,648 A | * | 9/1990 | Breeden et al. | 340/825.44 |
| 4,994,797 A | * | 2/1991 | Breeden | 340/825.44 |
| 5,394,140 A | * | 2/1995 | Wong et al. | 340/825.44 |
| 5,504,476 A | | 4/1996 | Marrs et al. | 340/825.44 |
| 5,604,491 A | * | 2/1997 | Coonley et al. | 340/825.44 |
| 5,752,163 A | * | 5/1998 | Robinson | 455/31.3 |
| 6,160,489 A | * | 12/2000 | Perry et al. | 340/825.44 |
| 6,169,882 B1 | * | 1/2001 | Amma | 455/38.3 |

* cited by examiner

Primary Examiner—Michael Horabik
Assistant Examiner—Vernal Brown

(57) ABSTRACT

A method and device are configured to generate alerts that are varied based upon whether an incoming communication is perceived to be mode (i.e., a non-urgency mode), with different tactile-based patterns being dependent upon the selection of the mode. That is, the patterns of the alerts for providing notification of urgent communications are distinguishable from the patterns of the alerts for providing notification of non-urgent communications. In the preferred embodiment, the communications device allows a user to assign particular vibrational patterns to specific sources of incoming communications, so that the vibration pattern identifies the urgency pattern and the original source of the communication. In the pager application, the pager may be configured by a user to uniquely associate a particular callback number with a first alert that is used when the pager is in the urgency mode and a second alert that is used when the pager is in the normal mode. The indication of perceived urgency can be provided by the user of the device or by a caller. In applications in which the user identifies perceived urgency, specific callback numbers may be associated with an urgent status, while all other numbers are associated with being non-urgent. Where a caller provides the input for identifying perceived urgency, an interactive voice response (IVR) unit may be used at the service provider of the particular communications device.

8 Claims, 4 Drawing Sheets

URGENCY-BASED VARIABLE CALL NOTIFICATION

TECHNICAL FIELD

The invention relates generally to communications devices that include alert mechanisms and more particularly to methods and devices for enabling a person to make an informed decision as to whether to respond to a call.

DESCRIPTION OF THE RELATED ART

Presently available wireless communications devices include radio pagers, telephony-enabled wireless laptop computers, personal digital assistants (PDAs), and cellular telephones. Each of these devices includes at least one alert mechanism to provide notification of an incoming communication. The alert mechanism may be a ringer similar to those found in home telephones, but other audible alerts are employed. For example, the detection of an incoming communication may trigger a melody or a periodic beep. As an alternative to an audible alert, a sound-free method of providing notification may be used. The most common silent approach is to provide a vibration-based notification. Such tactile alerts are often used in pagers. A pager may have a means of switching between providing an audible alert and a tactile alert.

When an incoming communication causes activation of an alert mechanism, the user is typically required to manipulate the wireless device in order to initiate a connection or to obtain the information for returning a call. For a pager, the communication may be the reception of a telephone number of a person requesting a callback. The callback number is visually presented on a pager display, such as a liquid crystal display (LCD).

Responding to an incoming communication may be impractical, and sometimes risky. A person operating a motorcycle may not be in a position to safely check the display of a pager. At other times, it may merely be inconvenient to respond to the activation of a pager or other wireless communications device, such as when a person has soiled hands from yard work or auto repair. At other times, the immediate response to a pager alert may be socially or professionally awkward, such as when a sound-free pager alert mechanism is triggered during a one-to-one meeting with a supervisor.

For occasions in which the response to notification of an incoming communication is risky, inconvenient or awkward, the owner of the pager or other communications device is placed in a position in which he or she must make a decision as to the appropriate action. The concern with not responding to the alert is that the communication may relate to an emergency situation. Without checking the display of a pager, the paged person is not in a position to determine the importance of a call. The difficulty is partially remedied by the apparatus described in U.S. Pat. No. 5,394,140 to Wong et al. The apparatus is used in a communication receiver to control an alert in response to receiving a callback number. When the callback number is received at a pager, a processor compares the number to numbers in a list of pre-programmed callback numbers. If the received callback number matches one of the pre-programmed numbers in the list, the processor selects a particular audible alert. The selected audible alert is used by an audible alert generation element to audibilize a notification having a particular cadence and/or a particular frequency. Consequently, the cadence and frequency can be used to identify a specific callback number.

The prior art apparatus to Wong et al. provides some information as a basis for the determination of whether to immediately respond to an audible notification of an incoming communication. However, merely knowing the identity of a caller or person requesting a callback is not sufficient information for determining whether the need for an immediate response justifies the risk, impracticality, or social or professional awkwardness associated with the immediate response.

What is needed is a method and device for enabling a user of a communications device to make informed decisions regarding whether to respond to call notifications.

SUMMARY OF THE INVENTION

A method of generating alerts relating to incoming communications includes enabling a communications device, such as a pager, to include both an urgency mode and a normal mode (i.e., a non-urgency mode). Operation in the urgency mode is triggered by a determination that a particular incoming communication has an urgency. The patterns of the alerts for providing notification of urgent communications are distinguishable from the patterns of alerts for providing notification of non-urgent communications. In the preferred embodiment, the alerts are tactile based, such as vibration-based notifications. In the most preferred embodiment, the communications device allows a user to assign particular vibrational patterns to specific sources of incoming communications. For example, a pager may be configured by a user to uniquely associate a particular callback number with first and second alerts, with the first alert being used when the urgency mode is triggered and the second alert being used when the pager is in the normal mode.

Human input may be used to identify calls as having an urgency with respect to notification. In one embodiment, the human input is from the user of the communications device. In this "smart device" embodiment, the user is able to configure the device to associate a particular call source to a particular pattern. For example, the supervisor of the user may be associated with a pattern of long-off-long-off-long-off. The urgency mode may be designed to convert the three "longs" to "shorts," so that the vibrational pattern of a pager is short-off-short-off-short-off when an incoming call is identified as being from the supervisor. The "smart" pager is configured to enable the user to assign and unassign the incoming communications from the supervisor as being urgent.

A "dumb" device may also be utilized in practicing the invention. In this embodiment, the unique associations of alert patterns to sources of calls may be configured at the location of the service provider. For example, in a paging system a server may be allowed to store pattern instructions. The pager owner configures which callers have which patterns, such as vibrational cadences. A short-off-short-off cadence may be designated as pattern 1. When the service provider determines that an incoming communication is from the source associated with pattern 1, the provider transmits an instruction to use pattern 1. The receiving communication device then generates the designated pattern. If the pager owner wishes to change the assignments of cadences to particular sources, this can be done by means of a voice menu at the service provider.

As another alternative, the assignments may be made at a web-based system. That is, the web-based system may be used by the device owner to designate the cadences assigned to particular telephone numbers. The web-based system may also be used to designate which calls are to be assigned an urgent status. Thus, all calls from a supervisor may be assigned an urgent status.

Interactive Voice Response (IVR) may be used to determine the perceived urgency of an incoming communication, such as a call or a page. If a communications device has sufficient computational sophistication (such as a laptop computer), the IVR techniques may be implemented at the device level. However, the IVR approach will typically need to be exercised at the service provider level. A verbal menu can be presented by an IVR unit of a wireless service provider. For example, a caller may be presented with an option of "Press or say 1 for an urgent page, or 2 for a non-urgent page." Conventional voice recognition or dual tone multifrequency (DTMF) recognition may be used to determine the input from the calling party. Based upon the determination, a message is sent to the communications device, with the message including an indication as to whether the urgency mode should be triggered.

In the preferred embodiment, the communications device includes a tactile-based alerting mechanism having an urgency mode and a non-urgency mode. The alerting mechanism is configured to generate distinguishable tactile alert patterns (e.g., vibrational cadences) based upon whether the alerting mechanism is in the urgency mode or the non-urgency mode. The device also includes a controller connected to selectively activate the alerting mechanism in response to incoming communications, such as calls or pages. The controller is enabled to access identifications of perceived urgency and is configured to switch the alerting mechanism to the urgency mode upon accessing an indication of perceived urgency for a particular incoming communication. The identification of perceived urgency may be generated internally if the communications device is a "smart" device. In another embodiment, the identifications of perceived urgency are received from a service provider, such as a pager system. In the most preferred embodiment, the communications device is a pager in which the selection of a particular vibrational pattern is based upon both perceived urgency and the recognition of a callback number. That is, each pre-programmed callback number is associated with a first alert pattern that is used when the alerting mechanism is in the urgency mode and is associated with a second alert pattern that is used when the alerting mechanism is in the non-urgency mode.

DETAILED DESCRIPTION

Figure 1:
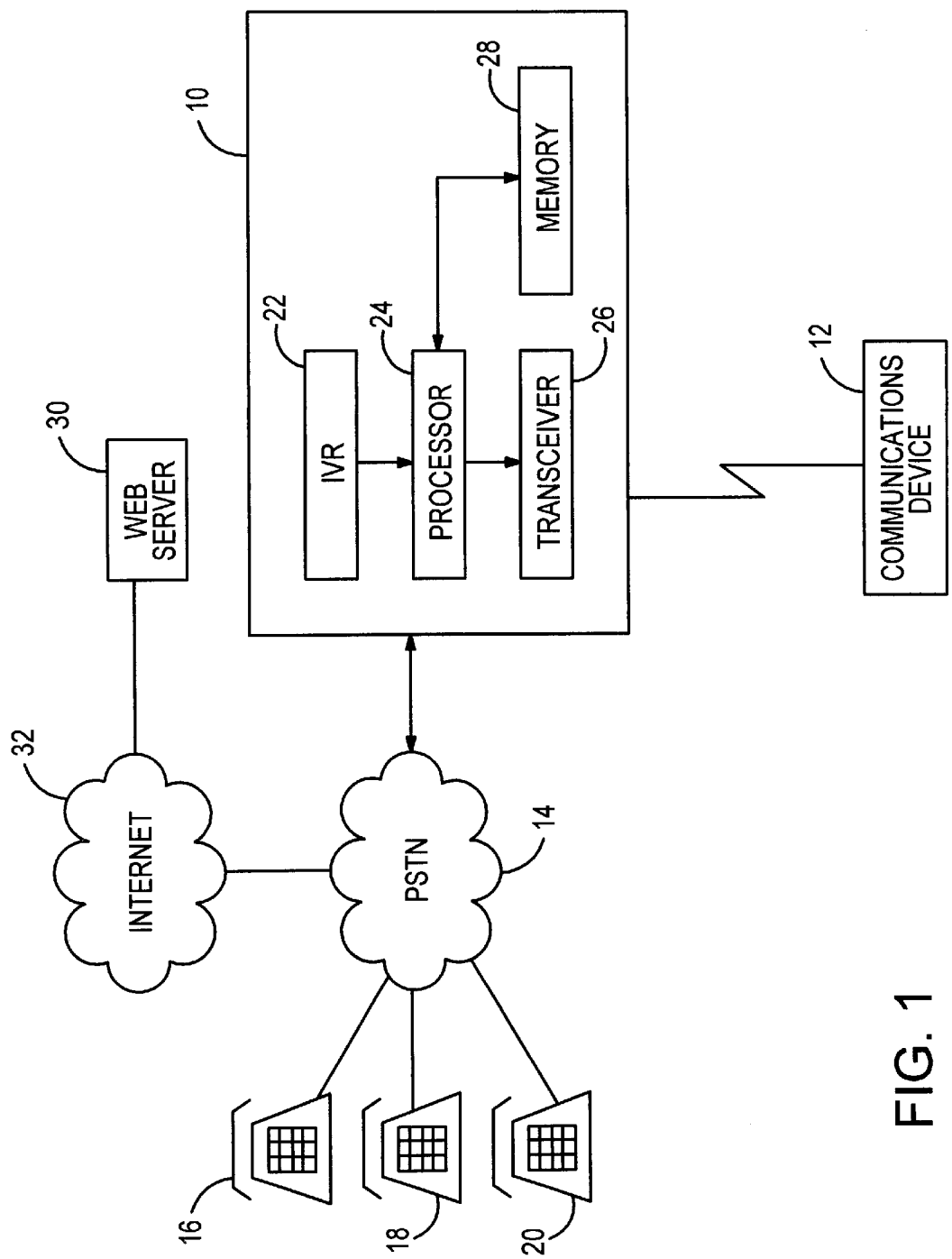
FIG. 1 is a block diagram of a system for providing urgency-based variable call notification in accordance with the invention.

With reference to FIG. 1, a system for providing urgency-based variations in call notifications includes equipment at a service provider 10 and includes a communications device 12. The communications device may be any wireless or wired device that receives incoming communications from a remote site, such as a service provider 10. However, in the preferred embodiment, the communications device is a wireless device, such as a cellular phone, a laptop computer having wireless capability, or a pager. In the most preferred embodiment, the communications device is a pager having a capability of receiving and displaying callback numbers.

In FIG. 1, the service provider is shown as being connected to a public switched telephone network (PSTN) 14. Three telephones 16, 18 and 20 are shown as being supported by the PSTN. The three telephones and other calling devices may contact the service provider 10 in order to trigger an incoming communication to the communications device 12. For example, in the pager application, the telephone 16 may contact the service provider 10 via the PSTN 14 in order to page the owner of the pager 12.

In the embodiment of FIG. 1, the equipment at the service provider includes an interactive voice response (IVR) unit 22, a processor 24, a transceiver 26, and memory 28. The IVR unit is employed to present voice prompts to callers. The use of IVR units for paging systems is well known in the art. However, a potential difference in the operation of the invention is that the IVR unit may be employed to aid in determining a perceived urgency of an incoming call. For example, in the paging application, the IVR unit may state the voice prompt, "Press or say 1 for an urgent page or 2 for a non-urgent page." The service provider 10 is enabled to determine the perceived urgency by using well known dual tone multifrequency (DTMF) recognition or voice recognition.

As will be explained more fully below, the identification of urgent pages or other incoming communications may determine a characteristic of the signals sent to the communications device 12. For example, a page which is identified as being urgent may trigger transmission of a first selected notification signal to the communications device 12, while the same page that is instead identified as being non-urgent would trigger transmission of a second selected notification signal. In the preferred embodiment, the two distinguishable notification signals generate distinguishable vibrational patterns at the communications device. Thus, a page that has been tagged as being urgent may cause a cadence of short-off-short-off, while a non-urgent page may cause a long-off-long-off. However, other tactile-based alerts may be substituted, if the alerts can be manipulated based upon perceived urgency. In the most preferred embodiment, the alert patterns that are generated at the communications device are distinguishable with respect to identification of the source of a call, in addition to being distinguishable with respect to perceived urgency. Thus, the recognition of a callback number is preferably one basis for determining the alert cadence at a pager, and the perceived urgency the second basis.

In order to enable the alert pattern to be based upon perceived urgency, an urgency-identification mechanism must be implemented. As noted above, the determination of urgency may be provided by detecting responses to the IVR unit 22 of the service provider 10. Appropriate voice prompts allow the calling party to provide the input. As a first alternative, the human input for identifying perceived urgency is provided by the owner of the communications device 12 by configuring information stored at the service provider 10. For example, the owner of a pager may be allocated space within the memory 28 for storing a limited number of telephone numbers. Then, when one of the stored telephone numbers is recognized as being the source of a call, the transmission to the communications device may be configured to trigger an urgency mode. On the other hand, all other calls would trigger the normal (non-urgent) mode of alerting the user of the device 12. As another alternative, the communications device may be configurable to selectively trigger the urgency mode. This is possible when the communications device includes memory for storing telephone numbers. If the communications device is a pager that recognizes a callback number as matching a stored telephone number that is designated as having an urgency, the urgency mode of the pager is triggered. As yet another alternative, the input may be made to a Web server 30 via the global communications network referred to as the Internet 32. A Web-based system may be used by the pager owner to designate the telephone numbers that are perceived as likely to have an urgency. Thus, all calls from a particular individual (e.g., a supervisor) may be assigned an urgent status.

Similarly, in order to enable the preferred embodiment in which alerts are varied based upon the source of a call, a number-identification mechanism is necessary. As one alternative, the communications device 12 is a "smart" device. A notification table can be configured to store a number of telephone numbers and to associate each number with a specific urgent alert and a specific non-urgent alert. For example, Notification Table 1 may be programmed into a pager or other communications device.

TABLE 1

NOTIFICATION

| Caller | Urgent | Non-urgent |
| --- | --- | --- |
| 650-555-1313 | Short-off-short-off | Long-off-long-off |
| 408-555-1616 | Short-off-short-off-short-off | Long-off-long-off-long-off |
| 408-555-1818 | Short-off | Long-off |
| All others | Short-off-short-off-short-off-short-off | Long-off-long-off-long-off-long-off |

The three stored telephone numbers may be those that are assigned to telephones that are most likely to be the sources of calls from the pager owner's spouse, supervisor, and administrator, respectively. Then, when a call from the owner's spouse is received and is tagged as having an urgent status, the pattern will be short-off-short-off. On the other hand, if the same call has a non-urgent status, the pattern will be long-off-long-off. As previously noted, the status of urgency may be assigned at the service provider 10 or the communications device 12.

In another embodiment, the communications device 12 is a "dumb" device that merely responds to signals received from the service provider 10. For example, in the paging system application in which the IVR unit 22 is used to present voice prompts for determining whether a caller perceives a page as being urgent, pages having an urgent status will trigger one alert cadence (e.g., a vibration pattern of short-off-short-off), while pages having a non-urgent status will trigger a second alert cadence (e.g., a vibration pattern of long-off-long-off). Alternatively, the memory 28 of the service provider 10 may be configured to store the Notification Table 1, so that the signal from the service provider 10 to the communications device 12 may be encoded to generate a vibration pattern that is based both upon the telephone number and the perceived urgency. The configuration of the notification table by a pager owner may be achieved using the IVR unit 22. The pager owner accesses a voice menu of the service provider to assign available urgent and non-urgent cadences to selected numbers.

As a third alternative, the Web server 30 may be used by a pager owner to designate the cadences assigned to particular telephone numbers. Thus, the owner accesses the Web server and specifies Notification Table 1. As previously noted, the Web-based system may be configured to assign an urgent status to all calls from a particular telephone number.

Figure 2:
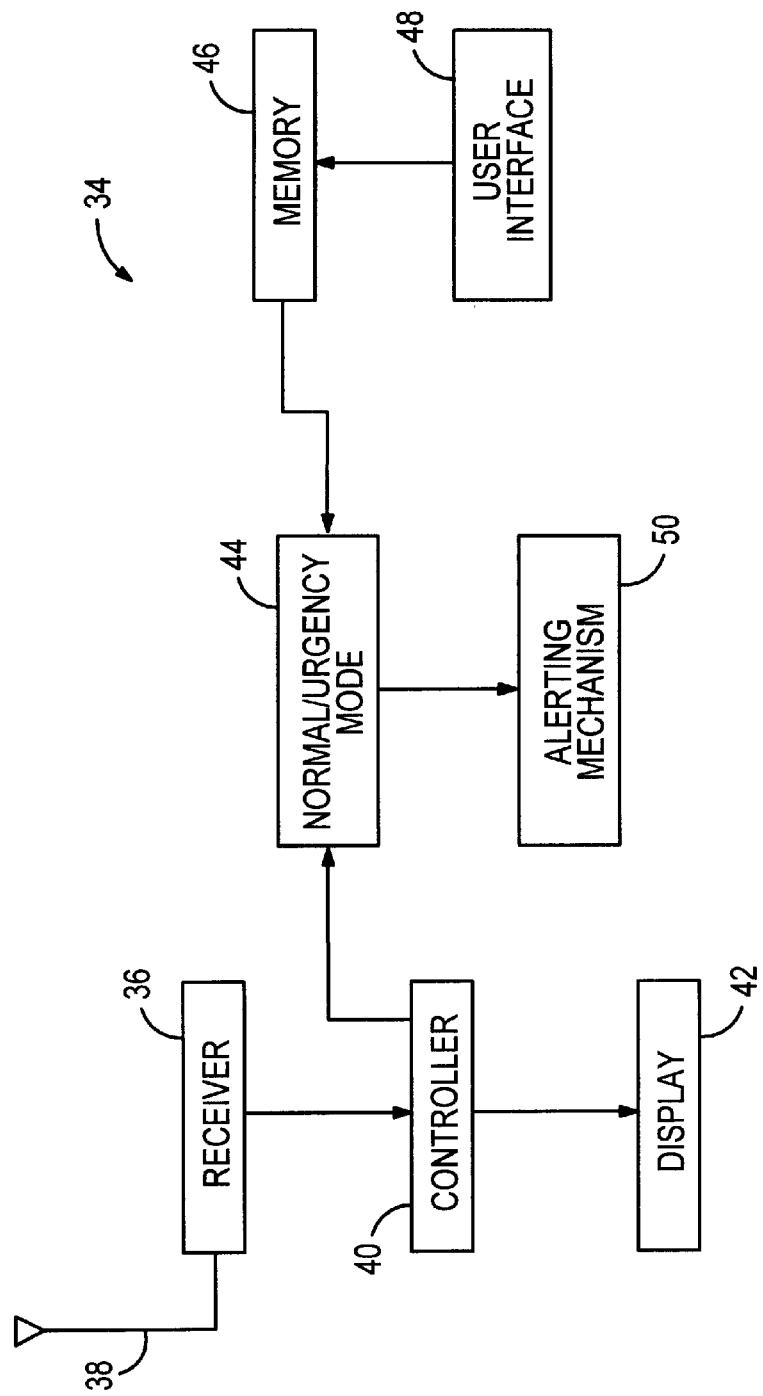
FIG. 2 is a block diagram of a communications device for use in the system of FIG. 1.

Referring now to FIG. 2, components of an exemplary "smart" pager 34 are shown in a block diagram. A conventional receiver 36 is linked to an antenna to accept incoming pages. A controller 40 determines operations of the components of the pager 34. A display 42 may be a liquid crystal display (LCD) or other such device that identifies a particular page. For example, the callback number may be visually displayed. Alternatively, the an audio presentation may be used to identify a number.

In the pager 34 of FIG. 2, a switching mechanism 44 is used to determine whether the pager is in the urgency mode or the normal mode. In the embodiment in which the determination of perceived urgency is executed at the paging service provider (e.g., by means of an IVR unit), the controller 40 transmits a signal to the switching mechanism 44 to identify the proper mode for each call. On the other hand, in some applications the determination of urgency or non-urgency is performed at the pager, as noted above. For example, a notification table may be programmed into memory 46 using a user interface 48. The memory is non-volatile memory. The user interface may be a miniaturized keyboard or any other device that permits a user to input information to memory 46.

An alerting mechanism 50 is configured to provide variable cadences, with the variations being based upon perceived urgencies and preferably upon callback numbers. The alerts are tactile-based, and preferably are variable vibration cadences.

Figure 3:
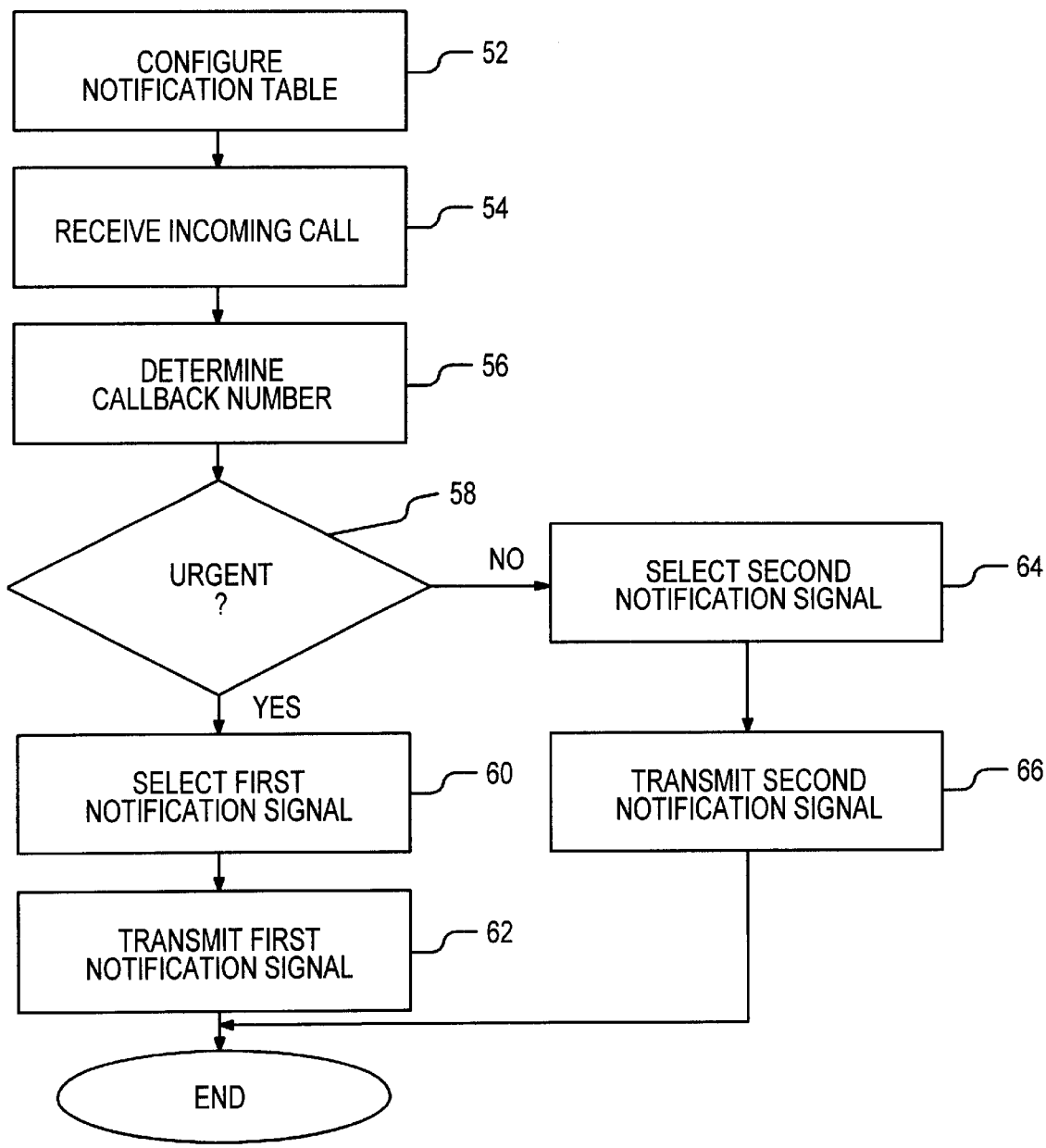
FIG. 3 is a process flow of steps for implementing the urgency-based variable call notification method at a service provider.

One embodiment of implementing the invention at the site of a service provider will be described with reference to FIG. 3. A first step 52 is to configure the notification table according to the requirements of the user of the communications device. For example, in the pager application the Notification Table 1 may be programmed into the memory 28 of the service provider 10 of FIG. 1. In the embodiment in which perceived urgency is the only basis for selecting an alert cadence, the configuration step 52 may not be necessary.

In step 54, an incoming call is received at the service provider 10. The incoming call may be from any one of the telephones 16–20 or from another type of device, such as a telephony-enabled computer. At step 56, the callback number is determined. In the paging application, this step is performed using conventional techniques. For example, voice prompts and DTMF recognition may be utilized.

In determination step 58, the urgency of the incoming call is identified. This may be done using the IVR unit 22. Alternatively, the notification table may be configured to assign an urgent status to all calls in which a particular callback number is identified. If a positive determination is made at step 58, a first notification signal is selected in step 60. The first notification signal is specific to triggering the urgency mode at the receiving communications device 12 and in the preferred embodiment the signal is also specific to the callback number. That is, the table of alert patterns is accessed at the service provider 10 and the appropriate alert pattern is "downloaded" to the communications device. The selected notification signal is transmitted to the communications device in step 62. The receiving communications device includes the alerting mechanism that informs the owner of an urgent incoming communication. The process then ends. If, on the other hand, a negative response is generated at determination step 58, the call that was received in step 54 is tagged as being non-urgent. Consequently, step 64 selects the second notification signal by accessing the table of alert patterns. The second notification signal is designed to automatically trigger a non-urgent alert at the communications device in response to transmitting the notification signal in step 66. The process then ends.

Figure 4:
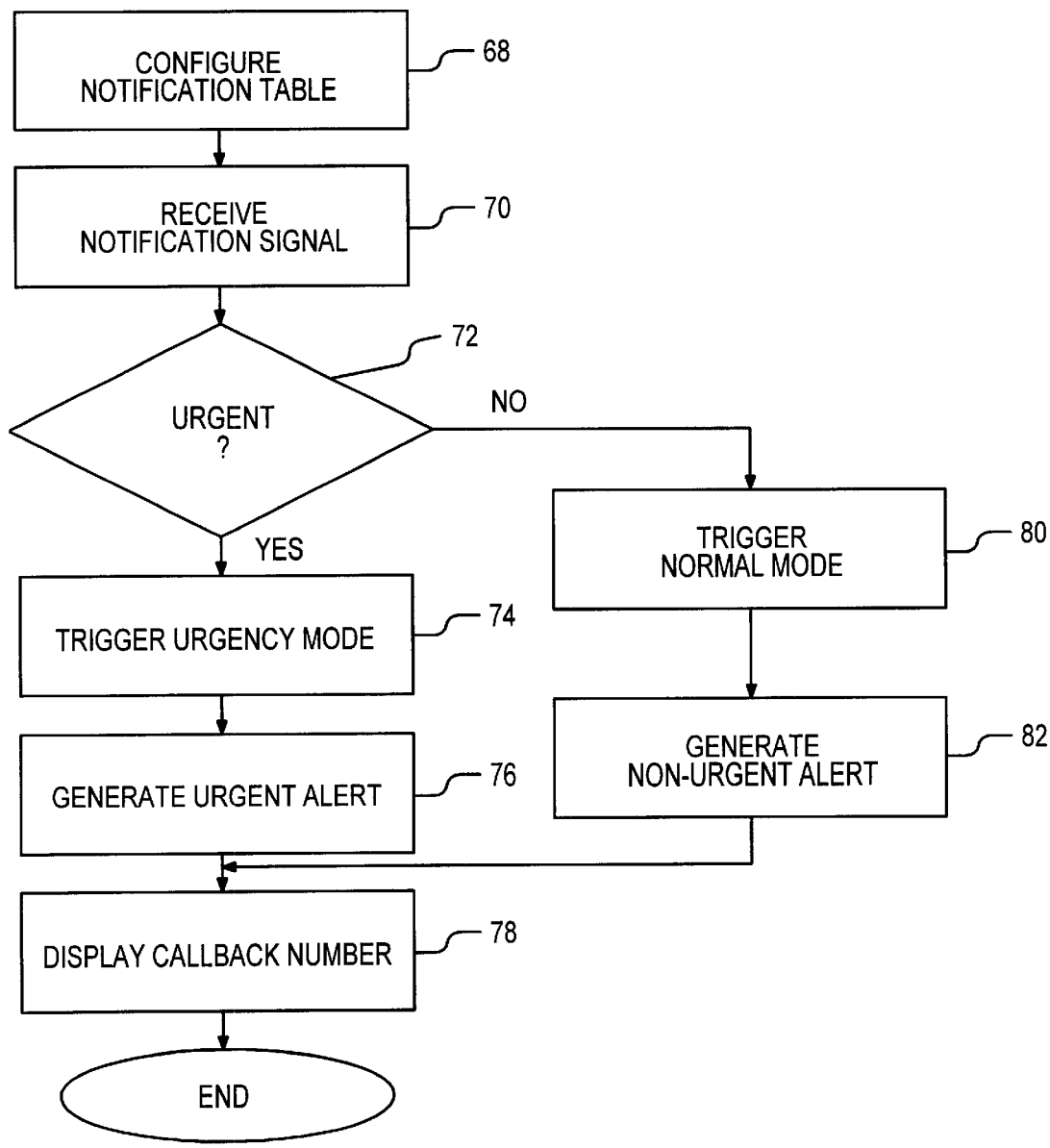
FIG. 4 is a process flow of steps for implementing the urgency-based variable call notification method at a communications device.

A flow of steps for executing the invention in a "smart" communications device is shown in FIG. 4. In step 68, the device is configured to include the notification table. For example, Notification Table 1 may be loaded into the memory 46 of FIG. 2 using the user interface 48.

In step 70, a notification signal of an incoming communication is received. In the pager application, the notification signal is a wireless transmission, but wired applications for the invention are contemplated. A determination step 72 identifies whether the incoming communication is perceived to be urgent. The means for designating a page as being urgent may be external or internal. For example, the urgency can be determined using the IVR unit as described above, so that the signal from the service provider 10 is indicative of the urgency and the callback number, but the alert pattern is determined only upon accessing the notification table stored at the device. Alternatively, the internally stored notification table may be configured to tag all incoming communications that identify a particular callback number as having an urgent status, so that the transmission to the device is indicative of the callback number, but not urgency.

If the incoming communication is identified as being urgent in the determination step 72, the urgency mode of the pager is triggered at step 74. In this mode, the alert that is generated in step 76 is recognizable by a user as indicating that an urgent communication has been received. The user can then make an informed decision as to whether to respond to the alert by viewing a callback number that is displayed at step 78.

If the determination step 72 results in a negative response (i.e., the communication is non-urgent), the normal mode is triggered at step 80. A non-urgent alert is generated at step 82. The user can then decide whether it is appropriate to view the callback number displayed at step 78.

While the invention has been described primarily with reference to paging systems, the urgency-based call notification variations can be utilized in other applications. As one example, telephony-enabled laptop computers can easily be configured to provide variable alerts. The alert scheme can also be used in wired applications.

What is claimed is:

1. A method of generating alerts relating to incoming calls to a communications device comprising steps of:

enabling said communications device to include at least two modes of call notification, including a normal mode and an urgency mode;

assigning a first vibrational alert and a second vibrational alert to each of a plurality of selected phone numbers such that each said selected phone number is uniquely associated with one of said first vibrational alerts and is uniquely associated with one of said second vibrational alerts;

recognizing matches of calls to said communications device with said selected telephone numbers;

enabling human input for identifying said calls as having an urgency with respect to notification, including providing voice prompts to callers via calls to said communications device, said voice prompts being generated from said communications device and being directed to acquiring indications from said callers as to perceived urgency of said calls;

distinguishing first calls to said communications device from second calls to said communications device, said first calls being calls identified as having an urgency with respect to notification, said distinguishing being at least partially based on recognizing responses to said voice prompts;

triggering said urgency mode at said communications device upon detecting each said first call, including generating said uniquely associated first vibrational alert for each said first call that is recognized as being matched with one of said selected telephone numbers; and triggering said normal mode at said communications device upon detecting each said second call, including generating said uniquely associated second vibrational alert for each said second call that is recognized as being matched with one of said selected telephone numbers.

2. The method of claim 1 wherein said first and second vibrational alerts are programmed into said communications device, said communications device being a pager.

3. The method of claim 1 wherein said step of enabling human input includes providing recognition of a known code that is generated by callers via said first and second calls.

4. The method of claim 1 wherein said step of enabling human input includes substeps of:

configuring said communications device to enter said urgency mode in response to identifications of selected remote communications devices as sources of said first calls; and enabling said identifications of said selected remote communications devices as said sources.

5. A method of generating call notifications at a pager comprising steps of:

configuring said pager to include a plurality of first vibrational alerts indicative of urgent calls and a plurality of second vibrational alerts indicative of non-urgent calls, including assigning a first vibrational alert and a second vibrational alert to each of a plurality of selected phone numbers such that each said selected phone number is uniquely associated with one of said first vibrational alerts and is uniquely associated with one of said second vibrational alerts, a total number of assigned said first and second vibrational alerts thereby being at least twice the number of said selected phone numbers;

enabling a user of said pager to repeatedly switch assignment of each said selected phone number to said first vibrational alert or to said second vibrational alert with which said each selected phone number is uniquely associated, thereby determining current number-to-alert assignments;

recognizing associations of incoming calls with said selected phone numbers when said incoming calls are received at said pager;

determining urgency perceived to be associated with said incoming calls received at said pager, including accessing said current number-to-alert assignments;

selecting among said first and second vibrational alerts based on recognitions of said selected phone numbers and on determinations of said perceived urgencies associated with said incoming calls, thereby selecting an assigned vibrational alert for each said incoming call; and triggering said assigned vibrational alerts for each of said incoming calls, thereby enabling detections of said perceived urgencies based on tactility.

6. A pager comprising:

a tactile-based alerting mechanism having an urgency mode and a non-urgency mode, said alerting mechanism being configured to generate distinguishable tactile alert patterns based upon whether said alerting mechanism is in said urgency mode or said non-urgency mode;

a controller connected to selectively activate said alerting mechanism in response to incoming communications, said controller being enabled to access identifications of perceived urgency for said incoming communications and being configured to switch said alerting mechanism to said urgency mode upon accessing an indication of perceived urgency for a particular incoming communication;

a transceiver connected to receive said incoming communications, said controller being connected to said receiver to detect that said particular incoming communication has been designated as having a perceived urgency;

an interactive voice response (IVR) unit cooperative with said controller and said transceiver to present voice prompts to callers initiating said incoming communications, said IVR unit being configured to generate voice prompts specific to acquiring said identifications from said callers as to perceived urgency of said incoming communications; and memory having a plurality of stored telephone numbers and having a plurality of stored tactile alert patterns, said stored tactile alert patterns being vibrational alerts, each said stored telephone number of said plurality of stored telephone numbers being uniquely associated with a pair of said stored tactile alert patterns, with a first pattern of said pair being dedicated to use when said alerting mechanism is in said urgency mode and a second pattern of said pair being dedicated for use when said alerting mechanism is in said non-urgency mode, said memory being responsive to said controller to supply said stored tactile alert patterns to said alerting mechanism at least partially based on detections of telephone numbers associated with said incoming communications and on said indications of perceived urgency;

said pager thereby including a plurality of first vibrational alerts indicative of urgent calls and a plurality of second vibrational alerts indicative of non-urgent calls.

7. The pager of claim 6 wherein said transceiver is configured to receive callback numbers via said incoming communications and to receive said indications of perceived urgency.

8. The pager of claim 7 further comprising a display connected to said receiver to visually display said callback numbers.

\* \* \* \* \*